Figure 1:
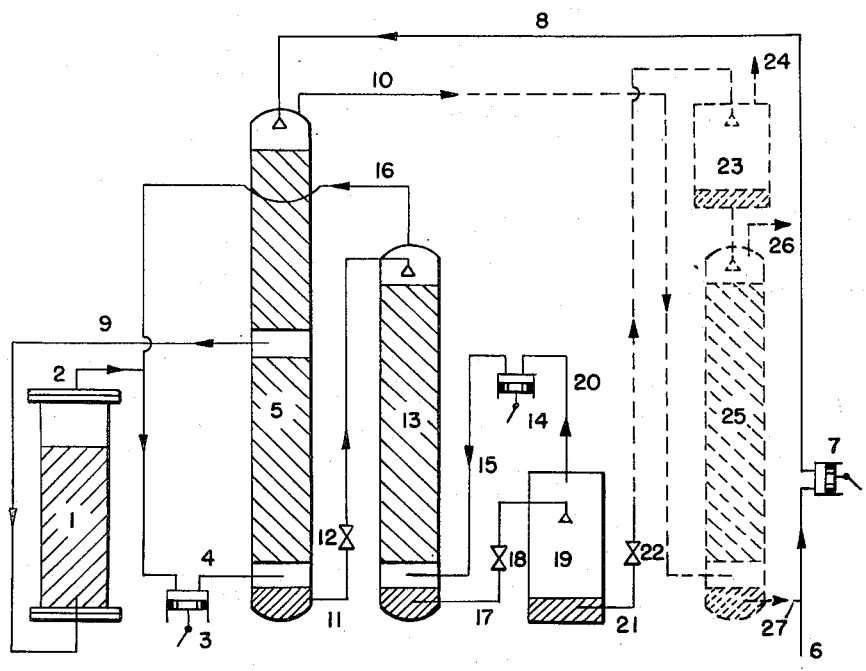

July 7, 1959

H. KINDLER 2,894,037

RECOVERY OF GASEOUS INITIAL MATERIALS OF
CHEMICAL REACTIONS FROM THE WASTE GAS

Filed Sept. 6, 1957

INVENTOR:
HUBERT KINDLER
BY
ATT'YS

United States Patent Office 2,894,037
Patented July 7, 1959

2,894,037

RECOVERY OF GASEOUS INITIAL MATERIALS OF CHEMICAL REACTIONS FROM THE WASTE GAS

Hubert Kindler, Ludwigshafen (Rhine), Germany, assignor to Badische Anilin- & Soda-Fabrik Aktiengesellschaft, Ludwigshafen (Rhine), Germany Application September 6, 1957, Serial No. 682,407

Claims priority, application Germany September 7, 1956

15 Claims. (Cl. 260—583)

This invention relates to a process for the recovery of unreacted gaseous initial materials in chemical reactions from the waste gas. In particular the invention relates to a process for the recovery of unreacted gaseous initial materials from the waste gas of the synthesis of alcohols from olefins, carbon monoxide and water and the synthesis of amines from olefins, carbon monoxide water and ammonia or nitrogen compounds having at least one reactive hydrogen atom attached to nitrogen. The terms "gas" and "gaseous substances" as employed in this specification and in the claims include all substances which are in gaseous phase under the conditions of the process of this invention.

In the carrying out of chemical reactions in which gaseous or vaporous substances are contained both in the initial materials and the end products, there is often present in the gaseous portion of the reaction products after leaving the reaction chamber, besides the newly formed products, a part of the unchanged initial material. In this case it is necessary to separate the gaseous portion of the reaction product into its components so that the valuable initial materials can be returned to the reaction chamber.

For example the components of the gaseous mixture which are more readily soluble in a suitable selective solvent can be washed out from the gas by the use of such selective solvent. In such a process, however, parts of the less soluble gases may also be dissolved in the liquid.

Methods are also known according to which the co-dissolved gases of less solubility can be separated again from the solution.

Mixtures of gases which consist for example of three components of different solubilities can be separated by fractional absorption in a selective solvent into the substance of greatest solubility ($a$) and a mixture of the substances of medium ($b$) and least ($c$) solubility. The most difficultly soluble component ($c$) can be recovered in pure form by known methods by treating the gas mixture with such a large amount of solvent that both the readily soluble component ($a$) and that of medium solubility ($b$) are completely absorbed, whereas only the difficulty soluble substance ($c$) remains undissolved. The mixture of the two dissolved substances ($a+b$) can then be separated, if necessary, by a suitable countercurrent process.

This process has the disadvantage that relatively large amounts of the solvent have to be led through the absorber and these must be brought to the pressure used in the absorption, which is usually considerable, by the use of large amounts of energy; moreover large quantities of return gas are required by reason of the high content of substances of medium solubility in the solution.

I have now found that gaseous or vaporous initial materials can be recovered from the waste gas of chemical reactions in which they are contained in admixture with at least two other gaseous or vaporous substances of which one has a greater solubility in a selective solvent and the other a smaller solubility in the same than the said initial materials, while avoiding the disadvantages of the known methods, by treating the gas mixture at any temperature and any pressure, preferably in countercurrent, with an amount of the said solvent sufficient for the absorption of the readily soluble component, freeing a part of the residual gas mixture thereby remaining undissolved in a second absorption apparatus by washing out, preferably in countercurrent, with the same solvent or a part of the same from the gaseous initial materials of medium solubility, introducing the solvent thus laden into the first absorber and returning the other part of the gas not dissolved in the first absorber to the reaction chamber.

This process has the advantage that smaller amounts of solvent are required and consequently energy is saved.

The amount of the gas stream returned to the reaction chamber from the first absorber can be varied within wide limits. It is determined by the concentration of the difficultly soluble gas in the waste gas of the chemical reaction, i.e. in the gas mixture to be separated. The smaller the amount of gas which is returned to the reaction chamber, the smaller is the amount of waste gas to be separated so that the energy requirement of the process and the dimensions of the absorption apparatus are reduced.

It is preferable to lead the whole of the amount of solvent necessary in the first absorption apparatus also through the second absorption apparatus and to lead through the second absorption apparatus such an amount of the gas mixture leaving the first absorption apparatus undissolved that the amount of solvent used therein is just sufficient to absorb completely the more readily soluble part of this gas. In many cases it may even be advantageous to make the gas current led to the second absorber smaller so that an excess of solvent is used therein, or to use in the second absorption apparatus less solvent than is required in the first absorber.

As the solvent it is advantageous to choose a substance in which the gases or vapors to be separated exhibit high solubility differences, the solubility of the more readily soluble component especially being very great. To avoid solvent losses, it is preferable to use substances which have a low vapor pressure.

The absorption of the gases can be carried out in any of the apparatus suitable for this purpose, for example filler body columns, bubble tray columns and the like; it is preferable to use a countercurrent between the gas and liquid phases.

The temperature in the absorption apparatus may lie above or below room temperature. It is advantageous to work at the lowest possible temperatures because the solubility of the gases is known to increase as the temperature of the solvent is lowered. In the practice of my invention the temperatures used are between minus 50° and plus 100° C. when water is used as a solvent the preferred range of temperatures is from 0° to 50° C. Since the solubility coefficient of carbon dioxide is dependent in a specially marked manner on the temperature, there is achieved by the said measure not only an increase in the absolute solubility of carbon dioxide but also an increase in the solubility difference as compared with the other components of the gas mixture to be separated. In general, operation is at room temperature in which range both the absolute solubility and the solubility difference as compared with other gas components is sufficiently great to permit carrying out the process without trouble. Since the temperature of the reaction chamber is in general above room temperature, it is necessary to cool the waste gas before entry into the absorption apparatus. In this way readily condensable vapors contained in the waste gas, as for example vapors of the solvent, are already separated to a great extent.

The process is preferably carried out at increased pressure. The entire pressure range from about 5 to 300 atmospheres comes into question. It is preferable to work at moderately increased pressures, for example at 8 to 50 atmospheres. It is often advantageous to keep both absorption apparatus at about the same pressure. In this case it is preferable to arrange the second absorber in a higher position than the first so that the solvent can flow from the second absorber into the first under the influence of gravitation without the use of pumps. It is of special advantage to combine the two absorption apparatus in a single countercurrent washing column from the middle part of which the gas mixture to be returned to the reaction chamber is withdrawn.

The pressure in the second absorber may however be kept higher or lower than in the first washing apparatus. Thus for example when the initial substance ($b$) has a relatively low solubility but the substance ($a$) has a good solubility, the energy requirement of the process can be diminished by maintaining in the second washing column a higher pressure so that only the partial stream of the gas to be supplied to this absorber need be compressed to such a high pressure.

It is usually necessary to separate the gas components of medium and low solubility dissolved by the solvent in the absorption apparatus from the solution containing mainly the most readily soluble component. For this purpose there may be used the known methods of multistage degassing or countercurrent exchange of substances or also suitable combinations of both methods, the resultant gas phase, into which the said co-dissolved gas components pass over, being returned in circulation to the first absorber or also returned to the reaction chamber.

Following this enrichment, the solvent contains only the most readily soluble gases. The solvent can be freed from the substance ($a$) by lowering the pressure, for example to below 1 atmosphere absolute, by heating and/or by driving it out with another gas, preferably in countercurrent, and then returned in circulation to the absorption apparatus. The stripping, which is preferably carried out at a lower pressure than the absorption, usually at atmospheric pressure, can be carried out by means of the gas to be returned from the first absorption apparatus to the reaction chamber or by means of the difficultly soluble gas leaving the second absorber or part of the same. The gas mixture thereby obtained can be returned in circulation to the reaction chamber of the first absorption apparatus or to the countercurrent apparatus. If it is desired to recover in pure form both the most readily and least readily soluble gases there may be led into the middle part of the stripping column a partial stream of the gas to be returned to the reaction chamber and into the lower part a relatively small amount of the difficultly soluble gas leaving the second absorber. In this way the regeneration of the solvent is carried out in many cases by the smallest possible amounts of return gas.

The employability of the process is not limited to mixtures of three components. Each kind of gas can in turn consist of a plurality of components. In addition to one or more initial materials of medium solubility to be recovered, there may also be present initial materials of lower solubility. Of these, a part is supplied again to the reaction while another part remains with the difficultly soluble gas to be removed.

The process is suitable for example for the recovery of unreacted initial materials in the production of alcohols from olefins, carbon monoxide and water and of alkylated amines from olefins, carbon monoxide water and ammonia or primary or secondary amines.

Above all I mean here processes in which olefins with 2 to 5 carbon atoms, especially ethylene, propylene and butylene, are reacted in the manner above described and in which the recovery of the unreacted portion of the olefinic component from the waste gas is of great importance.

All these processes show great similarity in the kind of chemical reaction, the catalysts used and the process technique of the operation. Thus in all these reactions carbon dioxide is formed as a byproduct and is contained in the waste gas together with the unreacted initial materials which are to be recovered according to this invention, and also together with further gaseous and vaporous byproducts. The waste gas contains three or more different components. Thus by the process according to this invention there may be worked up waste gases containing, in addition to carbon dioxide, the initial olefin and carbon monoxide, also hydrogen or saturated hydrocarbons which have been formed from the initial olefin in a side reaction or have been introduced together with the initial olefin, or other entrained gases, for example nitrogen. In these cases it is preferable to use water as solvent. The olefin to be recovered has a medium solubility whereas carbon dioxide dissolves especially well and the other gases to be removed (hydrogen, saturated hydrocarbons and nitrogen) are considerably more difficultly soluble. Carbon monoxide has a similar solubility to hydrogen and in the method of operation according to this invention remains partly in the difficultly soluble gas to be removed from which it can be separated by other methods if necessary; the remaining part is returned to the reaction. On the contrary, the olefins can be reacted chemically practically completely by the said method of operation.

Figure 2:
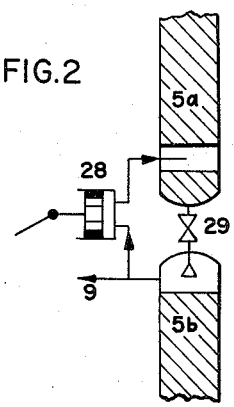

The following examples will further illustrate this invention but the invention is not restricted to these examples. Example 1 is given with reference to the accompanying drawing in which Fig. 1 shows diagrammatically by way of example an apparatus suitable for carrying out the process according to this invention. Fig. 2 illustrates an alternative embodiment of column 5 in Fig. 1 such that the upper and lower portions of the column are separated and the upper zone or unit 5a operated under a higher pressure than the lower zone or unit 5b by means of a suitable compressor 28. The percentages specified in the examples are by volume.

A gas mixture of about the same composition formed in other processes, can be separated in the same manner as described hereinbefore. As an example the reaction of ethylene, carbon monoxide, water and aniline or monopropylaniline producing monopropylaniline or dipropylaniline, respectively, or the reaction of ethylene, carbon monoxide and water producing n-propanol.

*Example 1*

A mixture of ethylene and carbon monoxide is reacted with aqueous ammonia in the presence of iron carbonyl and a tertiary amine for the production of tripropylamine. There are formed as byproducts: carbon dioxide and small amounts of hydrogen.

The reaction is preferably so conducted that from the reaction chamber there is withdrawn a gas mixture containing about 35% of $CO_2$
13% of $C_2H_4$
37% of $CO$
15% of $H_2$ and from this the initial products ethylene and carbon monoxide are separated for reuse.

According to the abovementioned process, 45 Nm.³/h. of gas of the said composition are withdrawn from reaction chamber 1 through pipe 2, brought to 30 atmospheres together with a return gas from column 13 in compressor 3 and supplied through pipe 4 to the lower end of a filler body column 5 through which flow 2.6 Nm.³/h. of water at room temperature as solvent which is supplied through pump 7 and pipe 8. From column 5 there pass hourly through pipe 9 25.7 Nm.³/h. of gas consisting of 0.9 Nm.³/h. of CO₂
5.9 Nm.³/h. of C₂H₄
13.6 Nm.³/h. of CO
5.3 Nm.³/h. of H₂ which is returned to the reaction chamber 1. At the top of column 5 there are withdrawn 3.1 Nm.³/h. of carbon monoxide and 1.4 Nm.³/h. of hydrogen in admixture with less than 0.5 Nm.³/h. of ethylene.

If desired, the upper zone 5a of column 5 can be a separate unit as shown in Fig. 2, in which case part of the gas is taken off through line 9 from the top of the bottom zone 5b and another part of this gas is compressed by the compressor 28 to the higher pressure in the upper zone 5a. Water flows countercurrently from the upper zone 5a through valve 29 to the lower zone 5b.

The washing water flows through pipe 11 through a pressure release valve 12 to the top of an exchange column 13 in which a pressure of 10.5 atmospheres is maintained. At the same time there are supplied to this column 13 at the lower end of compressor 14 and pipe 15 8.1 Nm.³/h. of carbon dioxide and 0.1 Nm.³/h. of ethylene. By the partial decompression and exchange of substances in countercurrent, there is obtained at th top of the column 13 a gas mixture which is composed of 8.9 Nm.³/h. of CO₂
1.2 Nm.³/h. of C₂H₄
0.8 Nm.³/h. of CO+H₂

It is combined through pipe 16 with the gas mixture coming through pipe 2 from the reaction chamber and supplied again to the washing tower 5 through compressor 3.

The washing water flows from column 13 through pipe 17 and valve 18 into a decompression vessel 19 in which it is partially gassed out under a pressure of 6.4 atmospheres; the return gas thus set free is supplied through pipe 20 to compressor 14. The water leaves the degasser 19 through pipe 21 and valve 22 with a residual content of 14.6 Nm.³/h. of carbon dioxide with which about 0.1% of ethylene is mixed and is discarded.

In another embodiment of the process, the water can be returned to the washing tower 5 in circulation after a regeneration. This case is indicated in the drawing by dotted lines.

In this case the solution is decompressed to about atmospheric pressure in a second degasser 23. From this there leaves at 24 12.5 Nm.³/h. of carbon dioxide with about 0.5% of gaseous ethylene. The water still containing carbon dioxide flows to a further countercurrent column 25 through which there is led from the bottom the gas mixture leaving column 5 through pipe 10. By exchange of substances, the carbon dioxide is thus expelled practically completely from the solvent and leaves the column 25 through pipe 26 together with the other gases. The water flows through pipe 27 to pump 7 again and on to the tower 7.

According to the known methods, the waste gas must be washed with a multiple of the abovementioned amount of water in order to wash out both the carbon dioxide and the ethylene from the waste gas. The solution obtained contains relatively large amounts of ethylene for the separation of which in column 13 large amounts of return gas are necessary. The energy requirement of the process thereby becomes very high.

Another possibility in the prior methods is to discard a part of the waste gas containing ethylene. In this way with the same inert gas content in the reaction chamber there is an ethylene loss of about 17% of the amount reacted.

By the method according to the present invention, on the contrary, the ethylene can be practically completely recovered with inconsiderably extra expenditure of energy.

*Example 2*

In the synthesis of butanol from propylene, carbon monoxide and water, the waste gas contains, besides the initial materials, also carbon dioxide and hydrogen as well as propane and nitrogen introduced with the propylene. The problem is to separate the valuable initial materials propylene and carbon monoxide from the mixture. 202.5 Nm.³/h. of waste gas from the butanol synthesis, consisting of 70.9 Nm.³/h. of carbon dioxide
20.3 Nm.³/h. of propylene
60.7 Nm.³/h. of carbon monoxide
6.0 Nm.³/h. of nitrogen
31.5 Nm.³/h. of hydrogen and
13.1 Nm.³/h. of propane are introduced under a pressure of 25 atmospheres into the bottom of a filler body column of 350 millimeters diameter and 18 meters height, through which 17.9 Nm.³/h. of water at room temperature flow. At about the middle of the column there are withdrawn 97.7 Nm.³/h. of gas consisting of 0.2 Nm.³/h. of carbon dioxide
20.1 Nm.³/h. of propylene
42.2 Nm.³/h. of carbon monoxide
4.0 Nm.³/h. of nitrogen
21.5 Nm.³/h. of hydrogen and
9.7 Nm.³/h. of propane and returned to the reaction chamber. At the top of the column there leaves 34 Nm.³/h. of undissolved gas consisting of 0.1 Nm.³/h. of propylene
18.5 Nm.³/h. of carbon monoxide
2.0 Nm.³/h. of nitrogen
10.0 Nm.³/h. of hydrogen and
3.4 Nm.³/h. of propane.

The water flowing away at the foot of the column is supplied to the top of a further countercurrent column in which a pressure of 12 atmospheres is maintained. At its upper end there are withdrawn about 40 Nm.³/h. of gas which is brought to 25 atmospheres and returned to the washing column together with the waste gas from the synthesis. After passing through the countercurrent column, the washing water is decompressed to 5 atmospheres and, after gassing out under this intermediate pressure, discarded with the gases still dissolved therein, namely 70 Nm.³/h. of carbon dioxide and 0.1 Nm.³/h. of propylene. The gas set free in the intermediate decompression at 5 atmospheres, about 95 Nm.³/h. is compressed to 12 atmospheres and led back into the lower part of the countercurrent column.

*Example 3*

With a propylene slightly contaminated by propane, the following working conditions result for example:

8.0 Nm.³/h. of a waste gas with
35% of CO₂
11% of C₃H₆
34% of CO
17% of H₂+N₂ and
3% of C₃H₈ are washed at 25 atmospheres with 650 liters per hour of water.

The amount of gas returned to the reaction chamber is 3.95 Nm.³/h. with 0.08 Nm.³/h. of CO₂
0.86 Nm.³/h. of C₃H₆
1.90 Nm.³/h. of CO
0.93 Nm.³/h. of H₂+N₂ and
0.18 Nm.³/h. of C₃H₈ while at the top of the column, for removal of hydrogen and propane, 1.33 Nm.³/h. of a gas mixture are withdrawn containing 0.02 Nm.³/h. of $C_3H_6$
0.82 Nm.³/h. of CO
0.43 Nm.³/h. of $H_2+N_2$ and
0.06 Nm.³/h. of $C_3H_8$ The further stages of the gas separation are similar to Example 2.

Obviously in these cases the washing water can also be freed from dissolved carbon dioxide by blowing with a difficultly soluble gas in countercurrent or if desired by stripping in vacuo, and returned to the washing process.

I claim:

1. In a process for the recovery and reutilization of an initial gaseous reactant emerging from a chemical reaction zone in admixture with at least two other gaseous substances of which one component (a) has a greater solubility and the other component (c) has a smaller solubility in a selective solvent than the initial gaseous reactant (b), the steps comprising: leading the gaseous mixture from said reaction zone through a first absorption zone for contact with an amount of a selective solvent sufficient to absorb component (a) at a pressure of 5–300 atmospheres and temperature of —50° to +100° C.; withdrawing from said first absorption zone and returning to said reaction zone one part of the unabsorbed gaseous mixture containing components (b) and (c); leading the other part of said unabsorbed gaseous mixture through a second absorption zone for contact with said selective solvent to absorb component (b), the solvent containing absorbed component (b), being introduced into said first absorption zone as at least a portion of the solvent required therein; withdrawing the unabsorbed component (c) from said second absorption zone; and withdrawing solvent containing absorbed component (a) from said first absorption zone.

2. A process as claimed in claim 1 wherein the gaseous mixture in both the first and second absorption zones is lead in countercurrent flow to the selective solvent.

3. A process as claimed in claim 1 wherein the amount of solvent employed in the second absorption zone is equal to the total amount of solvent required in the first absorption zone, and the quantity of the unabsorbed gaseous mixture containing components (b) and (c) being led through said second absorption zone is such that the amount of solvent employed in said second absorption zone is just sufficient to absorb component (b).

4. A process as claimed in claim 3 wherein the pressure in each of the two absorption zones is approximately equal.

5. A process as claimed in claim 1 wherein a higher pressure is maintained in said second absorption zone than in said first absorption zone, and the unabsorbed gaseous mixture led through said second absorption zone is compressed to said higher pressure after leaving said first absorption zone.

6. A process as claimed in claim 1 wherein the solvent containing absorbed component (a) withdrawn from said first absorption zone is subsequently treated to remove small quantities of components (b) and (c) absorbed by said solvent in the absorption zones by leading it through a gas exchange zone in which the solvent passes countercurrently to a gas containing component (a) obtained by degassing the solvent withdrawn from said gas exchange zone.

7. In a process for the recovery and reutilization of olefins and carbon monoxide from the waste gases in a chemical reaction for the synthesis of alkylated amines from olefins with 2 to 5 carbon atoms, carbon monoxide, water and a member of the group consisting of primary and secondary amines, said waste gases containing in addition to the unreacted initial material (b) olefin, the components (a) carbon dioxide and (c) hydrogen, carbon monoxide and saturated hydrocarbons, the steps which comprise: leading the waste gas from the reaction zone of said synthesis through a first absorption zone for contact in countercurrent flow with an amount of water sufficient to absorb the carbon dioxide at a pressure of 8–50 atmospheres and a temperature of from about 0° C. to about 50° C.; withdrawing from said first absorption zone and returning to said reaction zone one part of the unabsorbed gaseous mixture containing component (b) olefin and component (c) hydrogen, carbon monoxide and saturated hydrocarbons; leading the other part of said unabsorbed gaseous mixture through a second absorption zone for contact with water in countercurrent flow to absorb component (b) olefin, the water containing absorbed component (b) olefin being introduced into said first absorption zone as at least a portion of the solvent required therein; withdrawing the unabsorbed component (c) hydrogen, carbon monoxide and saturated hydrocarbons from said second absorption zone; and withdrawing water containing the absorbed component (a) carbon dioxide from said first absorption zone.

8. In a process for the recovery and reutilization of olefins and carbon monoxide from the waste gases in a chemical reaction for the synthesis of primary amines from olefins with 2 to 5 carbon atoms, carbon monoxide and aqueous ammonia, said waste gases containing in addition to the unreacted initial material (b) olefin, the components (a) carbon dioxide and (c) hydrogen, carbon monoxide and saturated hydrocarbons, the steps which comprise: leading the waste gas from the reaction zone of said synthesis through a first absorption zone for contact in countercurrent flow with an amount of water sufficient to absorb the carbon dioxide at a pressure of 8–50 atmospheres and temperature of from about 0° C. to about 50° C.; withdrawing from said first absorption zone and returning to said reaction zone one part of the unabsorbed gaseous mixture containing component (b) olefin and component (c) hydrogen, carbon monoxide and saturated hydrocarbons; leading the other part of said unabsorbed gaseous mixture through a second absorption zone for contact with water in countercurrent flow to absorb component (b) olefin, the water containing absorbed component (b) olefin being introduced into said first absorption zone as at least a portion of the solvent required therein; withdrawing the unabsorbed component (c) hydrogen, carbon monoxide and saturated hydrocarbons from said second absorption zone; and withdrawing water containing the absorbed component (a) carbon dioxide from said first absorption zone.

9. A process as claimed in claim 8 wherein said first and second absorption zones are combined in a single column into which the waste gas mixture is introduced at the bottom and water is introduced at the top, the part of the unabsorbed gaseous mixture which is returned to the reaction zone being withdrawn intermediately of the top and bottom of said column at a point just above that at which carbon dioxide has been absorbed in the column.

10. A process as claimed in claim 9 wherein the water containing absorbed component (a) carbon dioxide withdrawn from said first absorption zone is subsequently treated to remove small quantities of component (b) olefin and component (c) hydrogen, carbon monoxide and saturated hydrocarbons absorbed by said water in the absorption zones by leading it through a gas exchange zone in which the water passes countercurrently to a gas containing carbon dioxide obtained by degassing the water withdrawn from said gas exchange zone.

11. In a process for the recovery and reutilization of olefins and carbon monoxide from the wase gases in a chemical reaction for the synthesis of alcohols from olefins with 2 to 5 carbon atoms, carbon monoxide and water, said waste gases containing in addition to the unreacted initial material (b) olefin, the components (a) carbon dioxide and (c) hydrogen, carbon monoxide, saturated hydrocarbons and nitrogen, the steps which comprise: leading the waste gas from the reaction zone of said synthesis through a first absorption zone for contact in countercurrent flow with an amount of water sufficient to absorb the carbon dioxide at a pressure of 8–50 atmospheres and a temperature of from about 0° C. to about 50° C.; withdrawing from said first absorption zone and returning to said reaction zone one part of the unabsorbed gaseous mixture containing component (b) olefin and component (c) hydrogen, carbon monoxide, saturated hydrocarbons and nitrogen; leading the other part of said unabsorbed gaseous mixture through a second absorption zone for contact with water in countercurrent flow to absorb component (b) olefin, the water containing absorbed component (b) olefin being introduced into said first absorption zone as at least a portion of the solvent required therein; withdrawing the unabsorbed component (c) hydrogen, carbon monoxide, saturated hydrocarbons and nitrogen from said second absorption zone; and withdrawing water containing the absorbed component (a) carbon dioxide from said first absorption zone.

12. A process as claimed in claim 11 wherein said first and second absorption zones are combined in a single column into which the waste gas mixture is introduced at the bottom and water is introduced at the top, the part of the unabsorbed gaseous mixture which is returned to the reaction zone being withdrawn intermediately of the top and bottom of said column at a point just above that at which carbon dioxide has been absorbed in the column.

13. A process as claimed in claim 11 wherein the olefin is propylene and the saturated hydrocarbon is propane.

14. A process as claimed in claim 13 wherein said first and second absorption zones have the same pressure and are combined in a single column into which the waste gas is introduced at the bottom and water is introduced at the top, the part of the unabsorbed gaseous mixture which is returned to the reaction zone being withdrawn intermediately of the top and bottom of said column at a point just above that at which carbon dioxide has been absorbed in the column.

15. A process as claimed in claim 14 wherein the water containing carbon dioxide withdrawn from said first absorption zone is subsequently treated to remove small quantities of component (b) olefin and component (c) hydrogen, carbon monoxide, saturated hydrocarbons and nitrogen by leading it through a gas exchange zone in which the water passes countercurrently to a gas containing carbon dioxide obtained by degassing the water withdrawn from said gas exchange zone.

References Cited in the file of this patent

UNITED STATES PATENTS

| | | |
|---|---|---|
| 2,533,021 | Krchma | Dec. 5, 1950 |
| 2,757,754 | Natta | Aug. 7, 1956 |
| 2,789,149 | Bogart | Apr. 16, 1957 |